UNITED STATES PATENT OFFICE.

CHARLES M. O'HARA, OF FALL RIVER, MASSACHUSETTS.

IMPROVEMENT IN COMPOSITIONS FOR COVERING BOILERS, &c.

Specification forming part of Letters Patent No. 148,972, dated March 24, 1874; application filed August 9, 1873.

*To all whom it may concern:*

Be it known that I, CHARLES M. O'HARA, of Fall River, in the county of Bristol and State of Massachusetts, have invented certain new and useful Improvements in Non-Conducting Compositions; and I do hereby declare that the following is a full, clear, and exact description thereof.

The invention consists of a composition formed by the combination or admixture of ashes with the silicate of soda or other silicate. The object of the above combination is to form a cellular composition which, when dry, becomes an efficient non-conducting covering for preventing the escape of heat from the surfaces of boilers, steam-pipes, or other structures, the composition aforesaid being, when dry, highly cellular, and every cell a vacuum. The passage of heat through it is thereby greatly obstructed.

The mode of preparing the said composition is to mix a required quantity of ashes with liquid silicate till the ashes are reduced to a plastic condition. The ashes should be previously moistened with boiling water or steam to prevent the composition being too defluent during the process of application.

The composition thus formed is applied in the manner of ordinary plastics or cements.

Having thus fully described my invention, what I claim as new, and desire to secure by Letters Patent, is—

The non-conducting cellular composition formed by the combination of ashes and silicate of soda, in the manner and for the purpose set forth.

In testimony that I claim the foregoing as my own I affix my signature in presence of two witnesses.

CHARLES M. O'HARA.

Witnesses:
WALTER O'HARA,
WM. SANFORD.